(12) United States Patent
Mei et al.

(10) Patent No.: US 9,679,347 B2
(45) Date of Patent: Jun. 13, 2017

(54) SHADER PIPELINE WITH SHARED DATA CHANNELS

(71) Applicant: QUALCOMM Incorporated, San Diego, CA (US)

(72) Inventors: Chunhui Mei, San Diego, CA (US); Vineet Goel, La Jolla, CA (US); Donghyun Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 14/182,976

(22) Filed: Feb. 18, 2014

(65) Prior Publication Data

US 2015/0235341 A1    Aug. 20, 2015

(51) Int. Cl.
*G06T 1/00* (2006.01)
*G06T 1/60* (2006.01)
*G06T 15/80* (2011.01)
*G06T 1/20* (2006.01)

(52) U.S. Cl.
CPC ............ *G06T 1/60* (2013.01); *G06T 1/20* (2013.01); *G06T 15/80* (2013.01)

(58) Field of Classification Search
CPC ............................ G06T 15/506; G06T 15/005
USPC ................................................ 345/426, 522
See application file for complete search history.

(56) References Cited

U.S. PATENT DOCUMENTS

| | | | | |
|---|---|---|---|---|
| 2003/0050725 A1* | 3/2003 | Dirnfeldner | ......... | G05B 19/408 700/174 |
| 2005/0128206 A1* | 6/2005 | Fujimoto | .............. | G06T 15/005 345/539 |
| 2006/0070079 A1* | 3/2006 | Franchuk | .............. | G06F 9/4443 719/315 |
| 2007/0257935 A1* | 11/2007 | Koduri | ....................... | G06F 3/14 345/611 |
| 2008/0049031 A1 | 2/2008 | Liao et al. | | |
| 2008/0084423 A1 | 4/2008 | Bakalash et al. | | |
| 2009/0231348 A1 | 9/2009 | Mejdrich et al. | | |
| 2009/0284537 A1* | 11/2009 | Hong | .................... | G06T 15/005 345/522 |
| 2011/0285711 A1 | 11/2011 | Kilgard | | |
| 2012/0221808 A1 | 8/2012 | Coon et al. | | |
| 2012/0303900 A1 | 11/2012 | Engh-Halstvedt et al. | | |
| 2013/0038620 A1 | 2/2013 | Hakura et al. | | |
| 2013/0155080 A1* | 6/2013 | Nordlund | .............. | G06T 15/005 345/522 |

(Continued)

OTHER PUBLICATIONS

International Search Report and Written Opinion from International Application No. PCT/US2015/012917, dated Jul. 3, 2015, 9 pp.

(Continued)

*Primary Examiner* — Gregory J Tryder
*Assistant Examiner* — Yi Yang
(74) *Attorney, Agent, or Firm* — Shumaker & Sieffert, P.A.

(57) ABSTRACT

A graphics processing unit (GPU) may allocate a shared data channel in on-chip graphics memory of the GPU that is shared by at least two stages of a graphics processing pipeline. Shader units in the GPU may execute the at least two stages of the graphics processing pipeline. The GPU may store, in the shared data channel in on-chip graphics memory, data produced by each of the at least two stages of the graphics processing pipeline executing on the shader units.

18 Claims, 6 Drawing Sheets

(56) References Cited

U.S. PATENT DOCUMENTS

2013/0265307 A1   10/2013   Goel et al.

OTHER PUBLICATIONS

Second Written Opinion from International Application No. PCT/US2015/012917, dated May 30, 2016, 5 pp.
International Preliminary Report on Patentability from International Application No. PCT/US2015/012917, dated Jul. 27, 2016, 7 pp.

* cited by examiner

SHADER PIPELINE WITH SHARED DATA CHANNELS

TECHNICAL FIELD

This disclosure relates to shared data channels for storing data produced and consumed by stages of a graphics processing pipeline.

BACKGROUND

A graphics processing unit (GPU) of a computing device can execute a graphics processing pipeline that includes a plurality of stages for processing graphics commands to render a two-dimensional representation of a three-dimensional scene. A three-dimensional scene is typically made up of vertices, and the graphics processing pipeline includes a series of stages that are, for each vertex in the three-dimensional scene, executed in a fixed order to render a two-dimensional representation of the three-dimensional scene.

The graphics processing pipeline may include a chain of shader stages that executes to transform the vertices of the three-dimensional scene. Each of the shader stages consume data produced by previous stages and produces data for the next stages. Because of the vast amounts of data flowing through the chain of shader stages, how the data for the chain of shader stages are managed can affect performance and memory efficiency of the GPU.

SUMMARY

In one example of the disclosure, a method for graphics processing may include allocating, by a graphics processing unit (GPU), a shared data channel in on-chip graphics memory of the GPU that is shared by at least two stages of a graphics processing pipeline. The method may further include executing, on shader units in the GPU, the at least two stages of the graphics processing pipeline. The method may further include storing, by the GPU in the shared data channel in on-chip graphics memory, data produced by each of the at least two stages of the graphics processing pipeline executing on the shader units.

In another example of the disclosure, an apparatus for graphics processing may include a graphics processing unit (GPU) configured to: allocate a shared data channel in on-chip graphics memory of the GPU that is shared by at least two stages of a graphics processing pipeline; execute, on shader units in the GPU, the at least two stages of the graphics processing pipeline; and store, in the shared data channel in on-chip graphics memory, data produced by each of the at least two stages of the graphics processing pipeline executing on the shader units.

In another example of the disclosure, an apparatus for graphics for graphics processing may include means for allocating a shared data channel in on-chip graphics memory of a graphics processing unit (GPU) that is shared by at least two stages of a graphics processing pipeline. The apparatus may further include means for executing the at least two stages of the graphics processing pipeline. The apparatus may further include means for storing, in the shared data channel in on-chip graphics memory, data produced by execution of each of the at least two stages of the graphics processing pipeline.

In another example of the disclosure, a computer-readable storage medium may store instructions that, when executed, cause one or more programmable processors to: allocate a shared data channel in on-chip graphics memory of that is shared by at least two stages of a graphics processing pipeline; execute, on shader units, the at least two stages of the graphics processing pipeline; and store, in the shared data channel in on-chip graphics memory, data produced by each of the at least two stages of the graphics processing pipeline executing on the shader units.

The details of one or more examples are set forth in the accompanying drawings and the description below. Other features, objects, and advantages will be apparent from the description and drawings, and from the claims.

DETAILED DESCRIPTION

In general, this disclosure describes techniques for a single pass shader pipeline using a producer-consumer model with shared data channels. A graphical processing unit (GPU) in a computing device can execute a shader pipeline on shader units that may execute multiple stages of the shader pipeline at the same time on a GPU. Because data stored in on-chip memory in the GPU can typically be accessed more quickly and efficiently than data stored in system memory of the computing device, the efficiency of the shader units in the GPU can be increased by consuming data from data channels in on-chip memory in the GPU and by producing data that is also stored in data channels in on-chip memory in the GPU.

In one example, the GPU may allocate data channels of equal size to store data that is consumed and produced by execution of the shader pipeline by the shader units in the GPU. However, because on-chip memory in the GPU typically includes much less storage space than system memory of the computing device, on-chip memory in the GPU may not have sufficient storage space to allocate separate data channels for all of the data that are consumed and produced by the shader units in the GPU. Furthermore, because stages of the shader pipeline may be unbalanced such that some stages of the shader pipeline tends to produce more data than other stages of the shader pipeline, allocating equal space in on-chip memory for data produced by each stage of the shader pipeline may waste storage space in the on-chip memory. In addition, the on-chip memory may not have sufficient storage space to allocate equal space for data produced by each stage of the shader pipeline, such that at least some of the data produced by the stages of the shader pipeline may need to be stored in the slower system memory, thereby reducing the performance of the GPU.

In accordance with aspects of the present disclosure, the GPU may allocate shared data channels in the on-chip memory in the GPU such that two or more stages of the shader pipeline can share a single shared data channel, such that space in a shared data channel that is not being used to store data from a first stage of the shader pipeline that is sharing the shared data channel may be used to store data from a second stage of the shader pipeline that is sharing the data channel. In this way, the on-chip memory in the GPU may be utilized in a more efficient manner. Furthermore, by utilizing the on-chip memory in the GPU in a more efficient manner to potentially store more data produced by the shader pipeline compared to other approaches, the on-chip memory in the GPU may store more data that are ready to be consumed by the shader units executing stages of the shader pipeline, thereby increasing utilization of the shader units and increasing the performance of the GPU.

Figure 1:
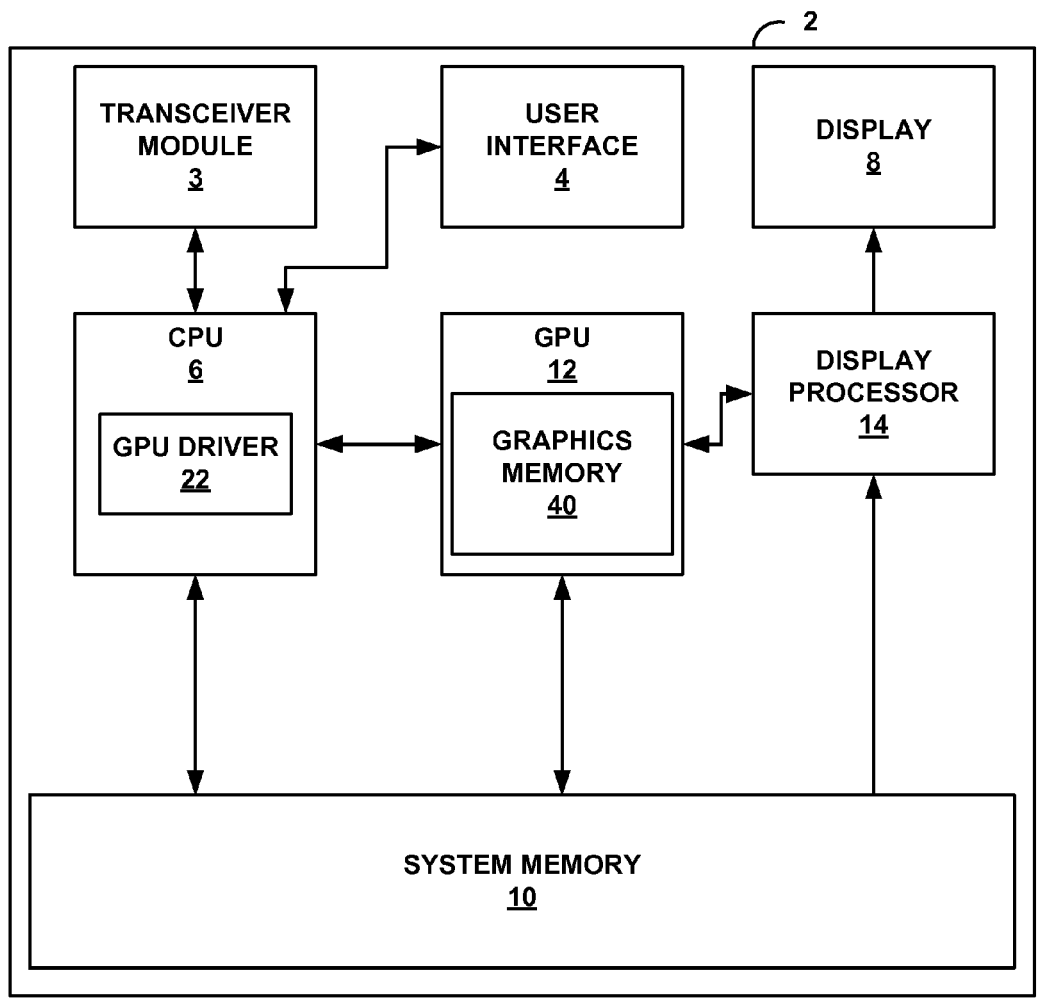
FIG. 1 is a block diagram illustrating an example computing device that may be configured to implement one or more aspects of this disclosure for sharing data channels amongst multiple graphics pipeline stages.

FIG. 1 is a block diagram illustrating an example computing device that may be configured to implement one or more aspects of this disclosure for sharing data channels amongst multiple graphics pipeline stages. As shown in FIG. 1, device 2 may be a computing device including but not limited to video devices, media players, set-top boxes, wireless handsets such as mobile telephones and so-called smartphones, personal digital assistants (PDAs), desktop computers, laptop computers, gaming consoles, video conferencing units, tablet computing devices, and the like. In the example of FIG. 1, device 2 may include central processing unit (CPU) 6, system memory 10, and GPU 12. Device 2 may also include display processor 14, transceiver module 3, user interface 4, and display 8. Transceiver module 3 and display processor 14 may both be part of the same integrated circuit (IC) as CPU 6 and/or GPU 12, may both be external to the IC or ICs that include CPU 6 and/or GPU 12, or may be formed in the IC that is external to the IC that includes CPU 6 and/or GPU 12.

Device 2 may include additional modules or units not shown in FIG. 1 for purposes of clarity. For example, device 2 may include a speaker and a microphone, neither of which are shown in FIG. 1, to effectuate telephonic communications in examples where device 2 is a mobile wireless telephone, or a speaker where device 2 is a media player. Device 2 may also include a video camera. Furthermore, the various modules and units shown in device 2 may not be necessary in every example of device 2. For example, user interface 4 and display 8 may be external to device 2 in examples where device 2 is a desktop computer or other device that is equipped to interface with an external user interface or display.

Examples of user interface 4 include, but are not limited to, a trackball, a mouse, a keyboard, and other types of input devices. User interface 4 may also be a touch screen and may be incorporated as a part of a display 8. Transceiver module 3 may include circuitry to allow wireless or wired communication between computing device 2 and another device or a network. Transceiver module 3 may include modulators, demodulators, amplifiers and other such circuitry for wired or wireless communication.

CPU 6 may be a microprocessor, such as a central processing unit (CPU) configured to process instructions of a computer program for execution. CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. Additionally, CPU 6 may execute GPU driver 22 for controlling the operation of GPU 12. The user may provide input to computing device 2 via one or more input devices (not shown) such as a keyboard, a mouse, a microphone, a touch pad or another input device that is coupled to computing device 2 via user interface 4.

The software applications that execute on CPU 6 may include one or more graphics rendering instructions that instruct CPU 6 to cause the rendering of graphics data to display 8. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 (e.g., through GPU driver 22) to cause GPU 12 to perform some or all of the rendering of the graphics data. In some examples, the graphics data to be rendered may include a list of graphics primitives, e.g., points, lines, triangles, quadrilaterals, triangle strips, etc.

GPU 12 may be configured to perform graphics operations to render one or more graphics primitives to display 8. Thus, when one of the software applications executing on CPU 6 requires graphics processing, CPU 6 may provide graphics commands and graphics data to GPU 12 for rendering to display 8. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements, such as shader units, that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 8 more quickly than drawing the scenes directly to display 8 using CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry. GPU 12 may also include one or more processor cores, so that GPU 12 may be referred to as a multi-core processor.

GPU 12 may be directly coupled to graphics memory 40. Thus, GPU 12 may read data from and write data to graphics memory 40 without using a bus. In other words, GPU 12 may process data locally using a local storage, instead of off-chip memory. Such graphics memory 40 may be referred to as on-chip memory. This allows GPU 12 to operate in a more efficient manner by eliminating the need of GPU 12 to read and write data via a bus, which may experience heavy bus traffic. In some instances, however, GPU 12 may not include a separate memory, but instead utilize system memory 10 via a bus. Graphics memory 40 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

In some examples, GPU 12 may store a fully formed image in system memory 10. Display processor 14 may retrieve the image from system memory 10 and output values that cause the pixels of display 8 to illuminate to display the image. Display 8 may the display of device 2 that displays the image content generated by GPU 12. Display 8 may be a liquid crystal display (LCD), an organic light emitting diode display (OLED), a cathode ray tube (CRT) display, a plasma display, or another type of display device.

In accordance with aspects of the present disclosure, GPU 12 may execute a plurality of graphics pipeline stages on its shader units. GPU 12 may create a shared data channel in graphics memory 40 that is shared by two stages of the plurality of graphics pipeline stages executing on the shader unit. GPU 12 may store data produced by each of the two stages of the plurality of graphics pipeline stages executing on shader units in the shared data channel.

Figure 2:
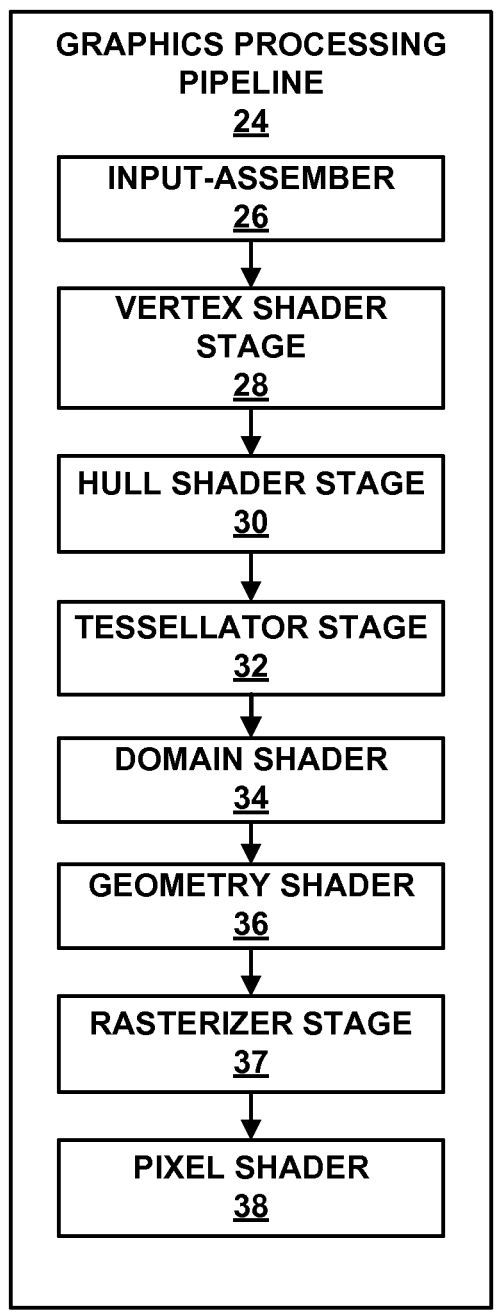
FIG. 2 is a block diagram illustrating an example graphics processing pipeline that may be performed by a GPU to create a two-dimensional representation of a three-dimensional scene.

FIG. 2 is a block diagram illustrating an example graphics processing pipeline 24 that may be performed by GPU 12 to create a two-dimensional representation of a three-dimensional scene. Graphics processing pipeline 24 may include a plurality of graphics processing stages that operate together to execute graphics processing commands. As shown in FIG. 2, graphics processing pipeline 24 may include input-assembler 26, vertex shader stage 28, hull shader stage 30, tessellator stage 32, domain shader stage 34, geometry shader stage 36, and pixel shader stage 38. Each of the components in graphics processing pipeline 24 may be implemented as fixed-function components, programmable components (e.g., as part of a shader program executing on a programmable shader unit), or as a combination of fixed-function and programmable components.

GPU 12 may be configured to receive one or more graphics processing commands from CPU 6, via GPU driver 22, and to execute the graphics processing commands via graphics processing pipeline 24 to generate displayable graphics images. As discussed above, graphics processing pipeline 24 includes a plurality of stages that operate together to execute graphics processing commands.

Input-assembler 26 in graphics processing pipeline 24 may be a fixed function stage that is generally responsible for supplying graphics data (e.g., triangles, lines, and points) to graphics processing pipeline 24. For example, input assembler stage 26 may collect vertex data for high order surfaces, primitives, and the like, and output vertex data and attributes to vertex shader stage 28. Accordingly, input assembler stage 26 may read vertices from an off-chip memory, such as system memory 10, using fixed function operations. Input assembler stage 26 may then create pipeline work items from these vertices, while also generating vertex identifiers ("VertexIDs"), instance identifiers ("InstanceIDs," which are made available to the vertex shader) and primitive identifiers ("PrimativeIDs," which are available to the geometry shader and pixel shader). Input assembler stage 26 may automatically generate VertexIDs, InstanceIDs, and PrimitiveIDs upon reading the vertices.

Vertex shader stage 28 may process the received vertex data and attributes. For example, vertex shader stage 28 may perform per-vertex processing such as transformations, skinning, vertex displacement, and calculating per-vertex material attributes. In some examples, vertex shader stage 28 may generate texture coordinates, vertex color, vertex lighting, fog factors, and the like. Vertex shader stage 28 generally takes a single input vertex and outputs a single, processed output vertex.

Hull shader stage 30, tessellator 32, and domain shader stage 34 may be collectively referred to as tessellation stages. The tessellation stages convert low-detail subdivision surfaces into higher-detail primitives, and tiles high-order surfaces into suitable surfaces (e.g., triangles) for rendering. Hull shader stage 30 receives primitives from vertex shader stage 28 and is responsible for carrying out at least two actions. First, hull shader stage 30 is typically responsible for determining a set of tessellation factors. Hull shader stage 30 may generate tessellation factors once per primitive. The tessellation factors may be used by tessellator stage 32 to determine how finely to tessellate a given primitive (e.g., split the primitive into smaller parts). Hull shader stage 30 is also responsible for generating control points that will later be used by domain shader stage 34. That is, for example, hull shader stage 30 is responsible for generating control points that will be used by domain shader stage 34 to create actual tessellated vertices, which are eventually used in rendering.

When tessellator stage 32 receives data from hull shader stage 30, tessellator stage 32 uses one of several algorithms to determine an appropriate sampling pattern for the current primitive type. For example, in general, tessellator stage 32 converts a requested amount of tessellation (as determined by hull shader stage 30) into a group of coordinate points within a current "domain." That is, depending on the tessellation factors from hull shader stage 30, as well as the particular configuration of the tessellator stage 32, tessellator stage 32 determines which points in a current primitive need to be sampled in order to tessellate the input primitive into smaller parts. The output of tessellator stage 32 may be a set of domain points, which may include barycentric coordinates.

Domain shader stage 34 takes the domain points, in addition to control points produced by hull shader stage 30, and uses the domain points to create new vertices. Domain shader stage 34 can use the complete list of control points generated for the current primitive, textures, procedural algorithms, or anything else, to convert the barycentric "location" for each tessellated point into the output geometry that is passed on to the next stage in the pipeline.

Geometry shader stage 36 may receive a primitive defined by its vertex data (e.g., three vertices for a triangle, two vertices for a line, or a single vertex for a point) and further process the primitive. For example, geometry shader stage 36 may perform per-primitive processing such as silhouette-edge detection and shadow volume extrusion, among other possible processing operations. Accordingly, geometry shader stage 36 may receive one primitive as an input (which may include one or more vertices) and outputs zero, one, or multiple primitives (which again may include one or more vertices). The output primitive may contain more data than may be possible without geometry shader stage 36. The total amount of output data may be equal to the vertex size multiplied by the vertex count, and may be limited per invocation. The stream output from geometry shader stage 36 may allow primitives reaching this stage to be stored to the off-chip memory, such as system memory 10. The stream output is typically tied to geometry shader stage 36, and both may be programmed together (e.g., using an API).

Rasterizer stage 37 is typically a fixed function stage that is responsible for clipping primitives and preparing primitives for pixel shader stage 38. For example, rasterizer stage 37 may perform clipping (including custom clip boundaries), perspective divide, viewport/scissor selection and implementation, render target selection and primitive setup. In this way, rasterizer stage 37 may generate a number of fragments for shading by pixel shader stage 38.

Pixel shader stage 38 receives fragments from rasterizer stage 37 and generates per-pixel data, such as color. Pixel shader stage 38 may also perform per-pixel processing such as texture blending and lighting model computation. Accordingly, pixel shader stage 38 may receive one pixel as an input and may output one pixel at the same relative position (or a zero value for the pixel).

In accordance with aspects of the present disclosure, two or more stages of graphics processing pipeline 24 may share a shared data channel in graphics memory 40. For example, vertices produced by vertex shader stage 28 and domain shader stage 34 may be stored in a shared data channel. Furthermore, primitives produced by hull shader stage 30 and geometry shader stage 36 may be stored in another shared data channel. In this way, GPU 12 may more efficiently utilize graphics memory 40.

Figure 3:
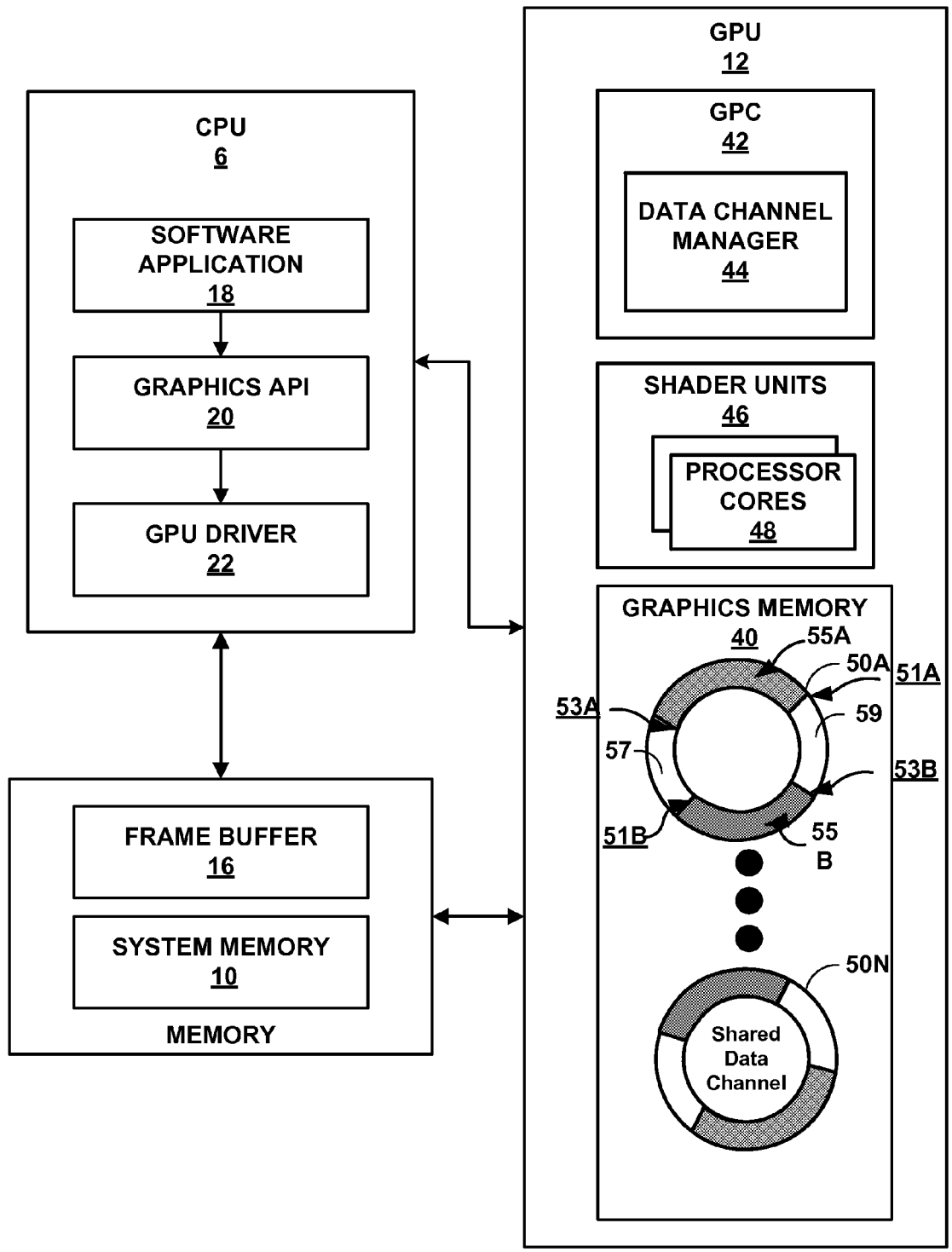
FIG. 3 is a block diagram illustrating example implementations of the CPU, the GPU, and the system memory of FIG. 1 in further detail.

FIG. 3 is a block diagram illustrating example implementations of CPU 6, GPU 12, and system memory 10 of FIG. 1 in further detail. As shown in FIG. 3, CPU 6 may include at least one software application 18, graphics API 20, and GPU driver 22, each of which may be one or more software applications or services that execute on CPU 6.

Memory available to CPU 6 and GPU 12 may include system memory 10 and frame buffer 16. Frame buffer 16 may be a part of system memory 10 or may be separate from system memory 10. Frame buffer 16 may store rendered image data.

Software application 18 may be any application that utilizes the functionality of GPU 12. For example, software application 18 may be a GUI application, an operating system, a portable mapping application, a computer-aided design program for engineering or artistic applications, a video game application, or another type of software application that uses 2D or 3D graphics.

Software application 18 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 18 may invoke GPU driver 22, via graphics API 20, to issue one or more commands to GPU 12 for rendering one or more graphics primitives into displayable graphics images. For example, software application 18 may invoke GPU driver 22, via graphics API 20, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like. Based on the instructions issued by software application 18 to GPU driver 22, GPU driver 22 may formulate one or more commands that specify one or more operations for GPU 12 to perform in order to render the primitive. When GPU 12 receives a command from CPU 6, graphics processing pipeline 24 decodes the command and configures graphics processing pipeline 24 to perform the operation specified in the command. For example, input-assembler 26 in graphics processing pipeline 24 may read primitive data and assemble the data into primitives for use by the other graphics pipeline stages in graphics processing pipeline 24. After performing the specified operations, graphics processing pipeline 24 outputs the rendered data to frame buffer 16 associated with a display device.

Frame buffer 16 stores destination pixels for GPU 12. Each destination pixel may be associated with a unique screen pixel location. In some examples, frame buffer 16 may store color components and a destination alpha value for each destination pixel. For example, frame buffer 16 may store Red, Green, Blue, Alpha (RGBA) components for each pixel where the "RGB" components correspond to color values and the "A" component corresponds to a destination alpha value. Although frame buffer 16 and system memory 10 are illustrated as being separate memory units, in other examples, frame buffer 16 may be part of system memory 10.

In some examples, vertex shader stage 28, hull shader stage 30, domain shader stage 34, geometry shader stage, and pixel shader stage 38 of graphics processing pipeline 24 may be considered shader stages. These shader stages may be implemented as one or more shader programs that execute on shader units 46 in GPU 12. Shader units 46 may be configured as a programmable pipeline of processing components. In some examples, shading unit 46 may be referred to as "shader processors" or "unified shaders," and may perform geometry, vertex, pixel, or other shading operations to render graphics. Shader units 46 may include processor cores 48, each of which may include one or more components for fetching and decoding operations, one or more arithmetic logic units for carrying out arithmetic calculations, one or more memories, caches, and registers.

GPU 12 may designate shader units 46 to perform a variety of shading operations such as vertex shading, hull shading, domain shading, geometry shading, pixel shading, and the like by sending commands to shader units 46 to execute one or more of vertex shader stage 28, hull shader stage 30, domain shader stage 34, geometry shader stage 36, and pixel shader stage 38 in graphics processing pipeline 24. In some examples, GPU driver 22 may be configured to compile one or more shader programs, and to download the compiled shader programs onto one or more programmable shader units contained within GPU 12. The shader programs may be written in a high level shading language, such as, e.g., an OpenGL Shading Language (GLSL), a High Level Shading Language (HLSL), a C for Graphics (Cg) shading language, etc. The compiled shader programs may include one or more instructions that control the operation of shader units 46 within GPU 12. For example, the shader programs may include vertex shader programs that may be executed by shader units 46 to perform the functions of vertex shader stage 28, hull shader programs that may be executed by shader units 46 to perform the functions of hull shader stage 30, domain shader programs that may be executed by shader unit 46 to perform the functions of domain shader stage 34, geometry shader programs that may be executed by shader unit 46 to perform the functions of geometry shader stage 36 and/or pixel shader programs that may be executed by shader units 46 to perform the functions of pixel shader 38. A vertex shader program may control the execution of a programmable vertex shader unit or a unified shader unit, and include instructions that specify one or more per-vertex operations.

Graphics memory 40 is on-chip storage or memory that physically integrated into the integrated circuit of GPU 12. Because graphics memory 40 is on-chip, GPU 12 may be able to read values from or write values to graphics memory 40 more quickly than reading values from or writing values to system memory 10 via a system bus. As such, the performance of shader units 46 may be increased by storing and reading data produced and consumed by shader stages of graphics processing pipeline 24 from graphics memory 40.

In accordance with aspects of the present disclosure, shader units 46 may perform multiple shading operations at the same time on processor cores 48. GPU 12 may send commands to shading unit 46 that enable different shading stages of graphics processing pipeline 24 to be executed on different processor cores 48, thereby interleaving the stages of graphics processing pipeline 24. For example, GPU 12 may send commands to shading unit 46 that causes shading unit 46 to execute vertex shader stage 28 and geometry shader stage 36 at the same time on different processor cores 48 of shader units 46. In another example, GPU 12 may send commands to shading unit 46 that causes shading unit 46 to execute multiple instances of geometry shader stage 36 at the same time on multiple processor In accordance with aspects of the present disclosure, graphics memory 40 may include one or more of shared data channels 50A-50N ("shared data channels 50") that enable data produced by different stages of graphics processing pipeline 24 to share a single data channel, thereby enabling GPU 12 to more efficiently utilize the limited space in graphics memory 40 and also enabling shader processor cluster 46 to increase utilization of its processor cores 48 to concurrently execute multiple stages of graphics processing pipeline 24.

Each shared data channel in shared data channels 50 may store data produced by the two or more stages of graphics processing pipeline 24. By sharing a shared data channel in shared data channels 50, as opposed to allocating data channels for individual stages of graphics processing pipeline 24, if a stage in graphics processing pipeline 24 produces less data, then another stage sharing the same shared data channel may be able to take advantage of that fact by storing more of the data it produces in the shared data channel.

In accordance with an aspect of the present disclosure, geometry processing unit (GPC) 42 may schedule the execution of shader processor cluster 46 based on the status of shared data channels 50. GPC 42 may monitor the shared data channels 50 to determine if there is enough data in shared data channels 50 to be consumed by the stages of graphics processing pipeline 24 to be executed by shader processor cluster 46. GPC 42 may also monitor the shared data channels 50 to determine if there is sufficient free space in shared data channels 50 to store data produced by the stages of graphics processing pipeline 24 to be executed by shader processor cluster 46. If GPC 42 determines that there is sufficient data and free space in shared data channels 50, GPC 42 may send execution commands to shader processor cluster 46 to execute a batch of stages of graphics processing pipeline 24. In response to completing execution of the batch of stages, shader processor cluster 46 may send a signal to GPC 42 indicating that processor cluster 46 has completed execution of the batch of stages. In response, data channel manager 44 may update the relevant read and write pointers for shared data channels 50. GPC 42 may include data channel manager 44 that manages shared data channels 50. Data channel manager 44 may manage read and write pointers for shared data channels 50 that point to locations within shared data channels 50 for writing data into and reading data from shared data channels 50.

In accordance with aspects of the present disclosure, shared data channel 50A may be a data channel that is shared by two or more stages of graphics processing pipeline 24, so that shared data channel 50A may store both data 55A outputted by a first stage of graphics processing pipeline 24 and data 55B outputted by a second stage of graphics processing pipeline 24. Shared data channel 50A may be a ring buffer so that data 55A and 55B may both dynamically increase and decrease its size when they are produced and/or consumed, thereby allowing more efficient use of the memory block allocated to shared data channel 50A. GPC 42 may manage write pointers 51A and 51B and read pointers 53A and 53B. Write pointer 51A may point to the memory location of shared data channel 50A to write data 55A, and read pointer 53A may point to the memory location of shared data channel 50A from which to read data 55A.

Typically, GPU 12 stores data 55A and 55B in shared data channel 50A in first-in-first-out (FIFO) order, so that read pointers 53A and 53B point to the memory locations of shared data channel 50A that stores the oldest piece of data in data 55A and 55B, respectively, sometimes referred to as the head of the queue, and so that write pointers 51A and 51B point to the memory locations of shared data channel 50A that stores the newest piece of data in data 55A and 55B, respectively, sometimes referred to as the tail of the queue.

Shared data channel 50A may also operate in FIFO mode so that data read from data 55A and 55B are deleted from shared data channel 50A and those memory locations may be deallocated. As can be seen, when GPU 12 reads data 55A from shared data channel 50A, free space 57 in shared data channel 50A increases, thereby allowing additional space in shared data channel 50A for GPU 12 to write data into data 55B. Similarly, when GPU 12 reads data 55B from shared data channel 50A, free space 59 in shared data channel 50A increases, thereby allowing additional space in shared data channel 50A for GPU 12 to write data into data 55A. Although only shared data channel 50A has been described in detail above, it should be understood that each shared data channel in shared data channels 50 may share the features described above with respect to shared data channel 50A.

Figure 4:
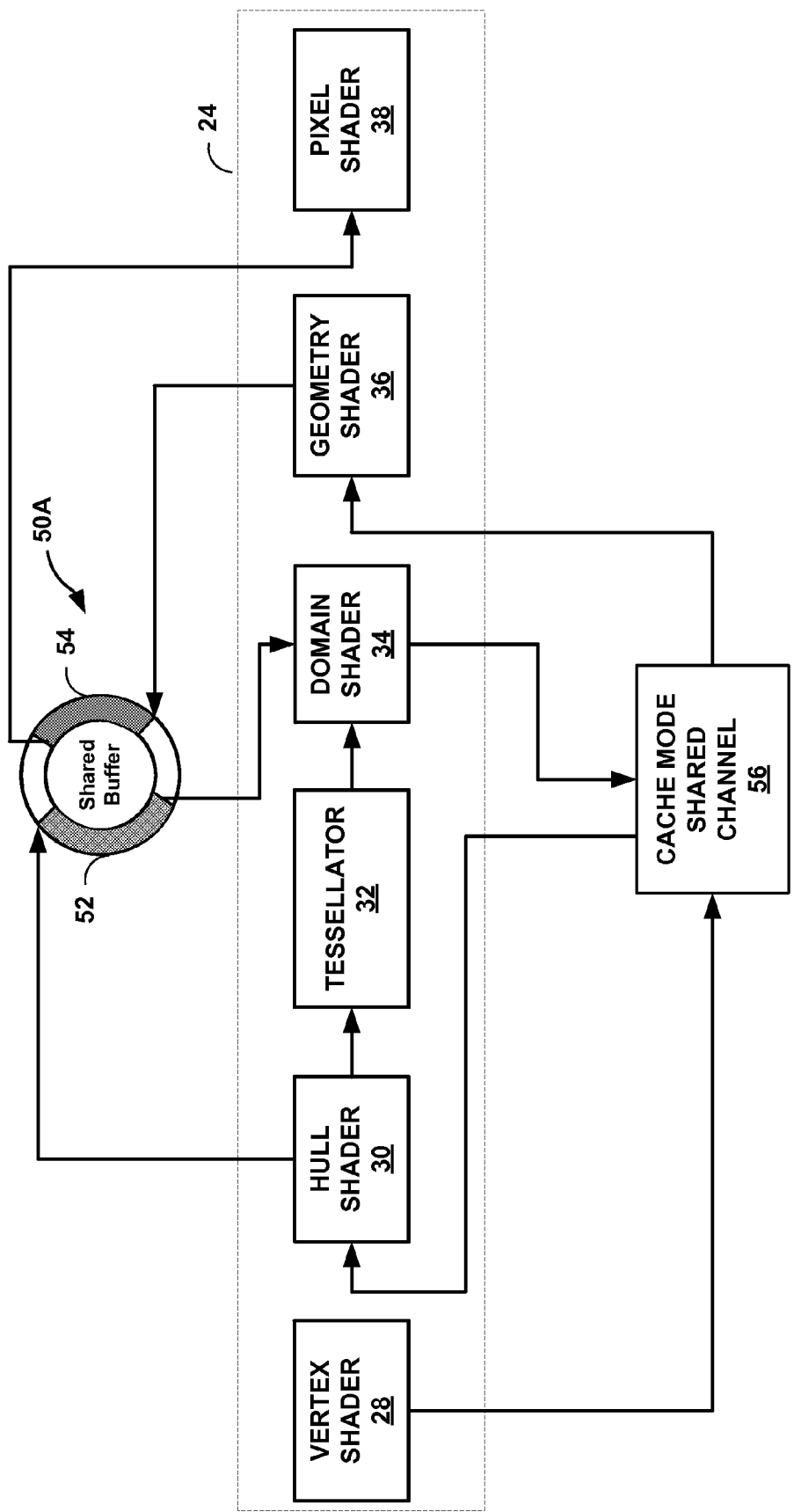
FIG. 4 is a block diagram illustrating an example of shared data channels in use in a graphics processing pipeline.

FIG. 4 is a block diagram illustrating an example of shared data channels 50 in use in graphics processing pipeline 24. As shown in FIG. 4, shared data channel 50A may be shared by stages of graphics processing pipeline 24 to store data produced by the stages.

Specifically, shared data channel 50A may store data 52 produced by hull shader stage 30 of graphics processing pipeline 24 and may further store data 54 produced by geometry shader stage 36 of graphics processing pipeline 24. Data 52 may be consumed by domain shader stage 34 of graphics processing pipeline 24 and data 54 may be consumed by pixel shader stage of graphics processing pipeline 24.

Data 52 and data 54 stored into shared data channel 50A by hull shader stage 30 and geometry shader stage 36 may include patch control points that are output by hull shader stage 30 and vertices that are output by geometry shader stage 36, respectively. Because data channel 50A does not cache data 52 and 54, data 52 and 54 may each act as a FIFO queue in which data read from data 52 and 54 are deleted from shared data channel 50A.

In some examples, the same data produced by some stages of graphics processing pipeline 24 may be consumed multiple times by other stages of graphics processing pipeline 24. If the data were stored into one of shared data channels 50 that acts as a FIFO queue, the stages of graphics processing pipeline 24 producing the data may need to execute multiple times to produce the same data because data stored into a FIFO queue may be deleted when it is read from the FIFO queue. Instead of executing vertex shader 28 or domain shader 34 multiple times to produce the same vertex multiple times, GPU 12 may instead cache the data produced by vertex shader 28 and domain shader 34 in cache mode shared channel 56.

For example, data produced by vertex shader stage 28 of graphics processing pipeline 24, including vertices transformed by vertex shader stage 28, may be consumed by hull shader stage 30 of graphics processing pipeline 24. Similarly, data produced by domain shader stage 34 of graphics processing pipeline 24, such as vertex positions output by domain shader stage 34, may be consumed by geometry shader stage 36 of graphics processing pipeline 24. For example, because adjacent primitives (e.g., triangles) may share vertices, the same vertex may be used to form two adjacent triangles. Thus, vertex data produced by vertex shader stage 28 and domain shader stage 34 may be consumed multiple times. Because the data produced by vertex shader stage 28 and domain shader stage 34 may be consumed multiple times, the data produced by these stages may be cached in cache mode shared channel 56, such that the cached data may not be deleted in response to it being read from cache mode shared channel 56.

Figure 5:
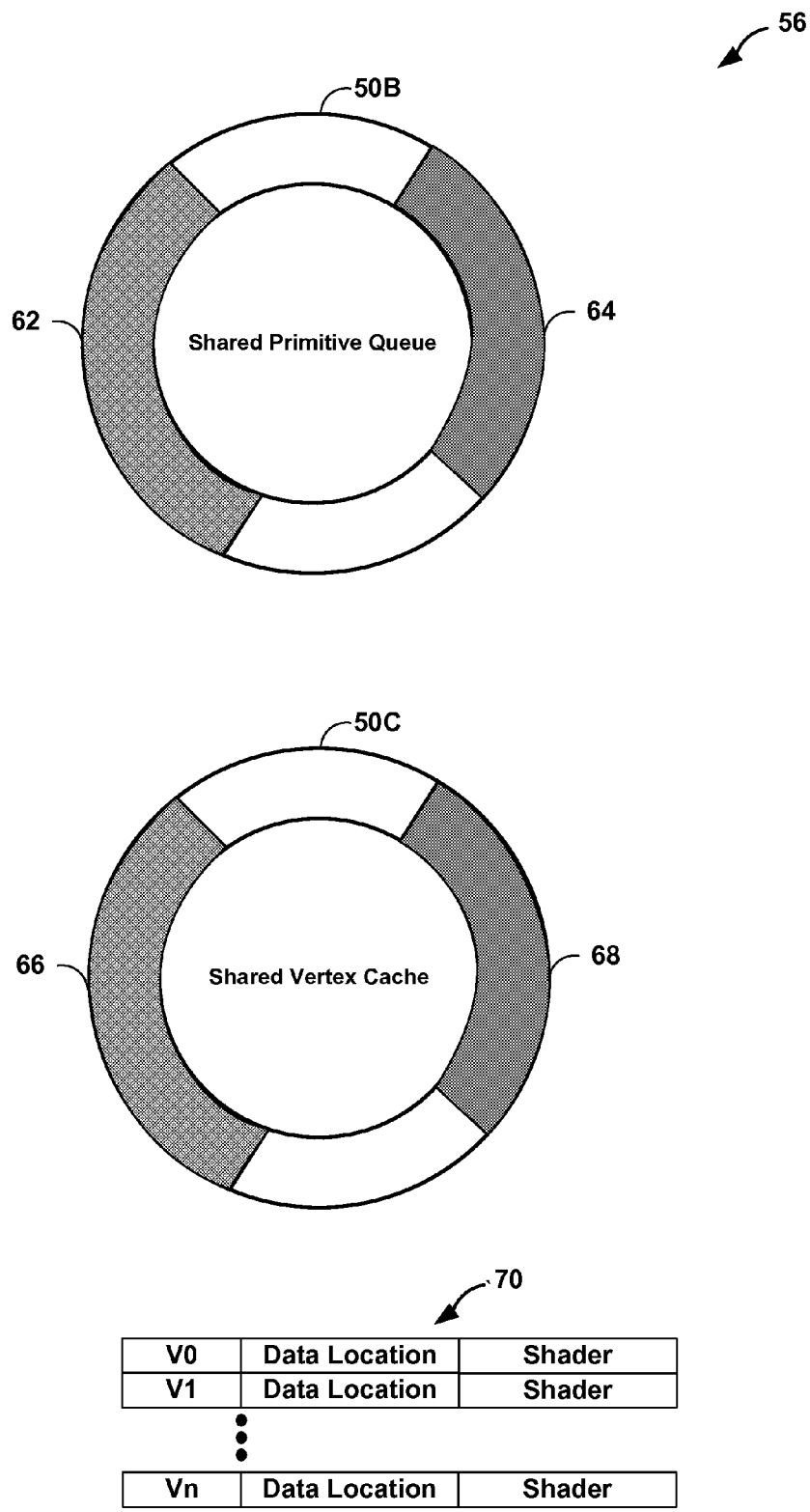
FIG. 5 is a block diagram illustrating the cache mode shared channel of FIG. 4 in further detail.

FIG. 5 is a block diagram illustrating cache mode shared channel 56. As shown in FIG. 5, cache mode shared channel 56 may include two shared data channels: shared primitive queue 50B and shared vertex cache 50C, as well as cache window 70. Shared vertex cache 50C may operate in cache mode, so that data stored into shared vertex cache 50C may not be deleted upon being read from shared vertex cache 50C. Data 62 and data 64 stored into shared primitive queue 50B may include primitive data produced by vertex shader stage 28 and domain shader stage 34. For example, data 62 may include vertex indices and the locations of vertex data stored at shared vertex cache 50C produced by vertex shader stage 28 for each primitive, and data 64 may include vertex indices and the locations of vertex data stored at shared vertex cache 50C produced by domain shader stage 34 for each primitive. Data 62 and 64 may also include deallocation flags for each of the associated primitives. Data 66 stored into shared vertex cache 50C may include vertices transformed by vertex shader stage 28, while data 68 stored into shared vertex cache 50C may include vertex positions output by domain shader stage 34. GPC 42 may check free space of both shared primitive queue 50B and shared vertex cache 50C to determine if cache mode shared channel 56 has enough free space to accept data.

Cache window 70 may store an indication if a particular vertex is already stored in a limited window of shared vertex cache 50C. For example, cache window 70 may act as fully associative cache and store the vertex index, the data location of the vertex within shared vertex cache 50C, and an indication, such as a flag, of the shader that may consume the vertex.

GPC 42 process geometry primitive by primitive. For vertex shader 28 and domain shader 34, if GPC 42 determines, based on checking cache window 70 on the vertex index, and/or the shader that the vertex belongs to, that the particular vertex of a primitive is not in shared vertex cache 50C, a cache miss may occur, and GPC 42 may send commands to shader units 46 to execute the appropriate shader stage (e.g., vertex shader 28 or domain shader 34) to produce the desired vertex and to store the produced vertex data in cache mode shared channel 56. GPC 42 may add vertex indices and locations of vertex data at shared vertex cache 50C into shared primitive queue 50B. GPC 42 may add to cache window 70 with the appropriate data for the vertex now cached in cache mode shared channel 56. Cache window 70 may act in first in first out (FIFO) fashion so that if there is no room in cache window 70 after a cache miss then the vertex associated in the oldest slot in cache window 70 and having its deallocation flag set in shared primitive queue 50B may be set with the information regarding the latest vertex added to cache mode shared channel 56. However, if GPC 42 determines that the particular vertex is cached in cache mode shared channel 56, GPC 42 can use the memory location in shared vertex cache 50C of the desired vertex and add vertex indices and locations of vertex data at shared vertex cache 50C into shared primitive queue 50B. In this way, GPU 12 can reduce extraneous processing of stages in graphics processing pipeline 24.

To execute hull shader 30 and geometry shader 36, GPC 42 may consume data from both shared primitive queue 50B and shared vertex cache 50C. GPC 42 may read vertex indices and locations of vertex data in shared vertex cache 50C from shared primitive queue 50B. GPC 42 may then read vertex data from shared vertex cache 50C using locations read from shared primitive queue 50B. GPC 42 may move read pointer of shared primitive queue 50B after reading the data. However because the following primitive may also use the same vertex that was just read out of shared vertex cache 50C, GPC 42 may not immediately move read pointer of shared vertex cache 50C right after the cached vertex is read from shared vertex cache 50C. If the associated deallocation flag in shared primitive queue 50B for the primitive consuming the vertex is set, then GPC 42 may be allowed to move the read pointers and to deallocate the vertex from cache mode shared channel 56. GPC 42 may send commands to shader units 46 to execute the shader stage (e.g., hull shader 30 and geometry shader 36) to consume the vertex data, and to produce the vertex for next shader stage and to store the produced vertex data in shared data channel 50A.

GPC 42 may monitor cache mode shared channel 56 and shared data channel 50A for deadlock. In one example, deadlock may occur if cache mode shared channel 56 is full of data produced by vertex shader stage 28, and if shared data channel 50A is full of data produced by hull shader stage 30. In this case, because hull shader stage 30 consumes data produced by vertex stage 28, hull shader stage 30 cannot consume data produced by vertex shader stage 28 and stored in cache mode shared channel 56 in order to produce data that is stored into shared data channel 50A because there is no free space in shared data channel 50A to store the newly produced data. Furthermore, because cache mode shared channel 56 is full of data produced by vertex shader stage 28, and none of that data can be consumed by hull shader 30, none of that data can be deallocated to free up space for cache mode shared channel 56 to store data produced by domain shader 34. Furthermore, because domain shader 34 consumes data produced by hull shader stage 30 and stored in shared data channel 50A, none of the data produced by hull shader 30A and stored in shared data channel 50A can be consumed by domain shader 34 to free up space in shared data channel 50A for shared data channel 50A to store data produced by geometry shader 36.

To prevent deadlock situations between cache mode shared channel 56 and shared data channel 50A, GPC 42 may reserve space in cache mode shared channel 56 and shared data channel 50A for storing data produced by domain shader 34 and geometry shader 36, respectively, so that cache mode shared channel 56 and shared data channel 50A do not only store data produced by vertex shader 28 and hull shader 30, respectively. GPC 42 may determine the amount of space of cache mode shared channel 56 in both components shared primitive queue 50B and shared vertex cache 50C, and the amount of space of shared data channel 50A to reserve by, for example, determining the amount of space necessary to store output from domain shader 34 and geometry shader 36 for a given number of waves in shader cluster 46.

Figure 6:
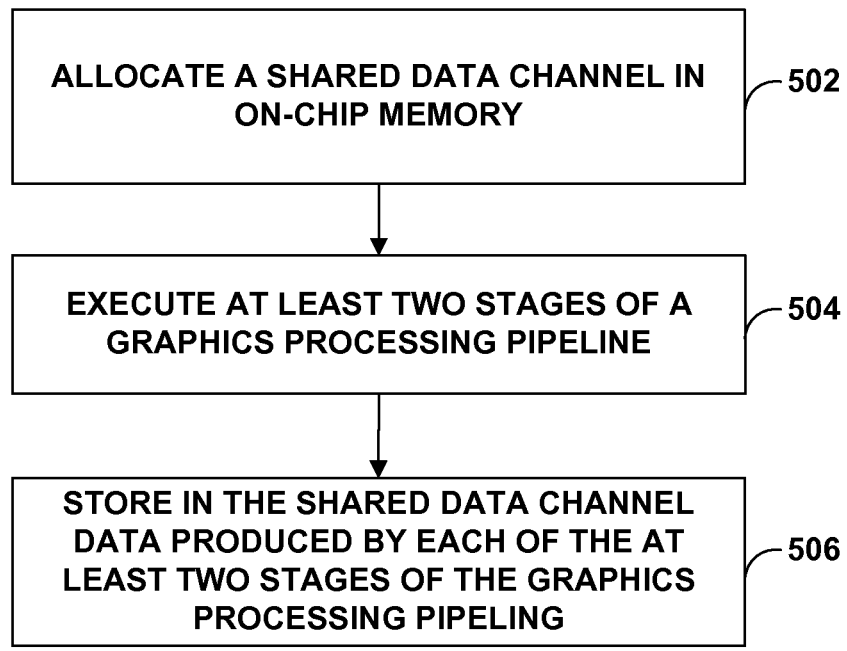
FIG. 6 is a flowchart illustrating an example process for sharing data channels by stages of a graphics processing pipeline.

FIG. 6 is a flowchart illustrating an example process for sharing data channels by stages of a graphics processing pipeline. As shown in FIG. 6, the process may include allocating, by GPU 12, shared data channel 50A in on-chip graphics memory 40 of GPU 12 that is shared by at least two stages of graphics processing pipeline 24 (502). The process may further include executing, on shader units 46 in GPU 12, the at least two stages of graphics processing pipeline 24 (504). The process may further include storing, by GPU 12 in shared data channel 50A in on-chip graphics memory 40, data produced by the at least two stages of graphics processing pipeline 24 executing on shader units 46 (506).

In some examples, the process may further include allocating, by GPU 12, a second cache mode shared channel 56 in on-chip graphics memory 40 of GPU 12 that is shared by a second at least two stages of graphics processing pipeline 24, wherein the shared data channel 50A is a first shared data channel. In some examples, the process may further include executing, on shader units 46 in GPU 12, the second at least two stages of graphics processing pipeline 24. In some examples, the process may further include storing, by GPU 12 in the second cache mode shared channel 56, second data produced by each of the second at least two stages of graphics processing pipeline 24 executing on shader units 46.

In some examples, the process may further include scheduling, by GPU 12, the execution of one or more stages of graphics processing pipeline 24 by shader units 46 based at least in part on a status of the first shared data channel 50A or the second cache mode shared channel 56 so that data is available in the first shared data channel 50A or the second cache mode shared channel 56 to be consumed by the one or more stages of graphics processing pipeline 24 when executing on shader units 46 and free space is available in the first shared data channel 50A or the second cache mode shared channel 56 to store data produced by the one or more stages of graphics processing pipeline 24 when executing on shader units 46.

In some examples, the at least two stages of graphics processing pipeline 24 includes vertex shader 28 and domain shader 34. In some examples, the second at least two stages of graphics processing pipeline 24 include hull shader 30 and a geometry shader 36.

In some examples, the process may further include reserving, by GPU 12, free space in at least one of the first shared data channel 50A and the second cache mode shared channel 56 to prevent deadlock between the first shared data channel 50A and the second cache mode shared channel 56.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" and "processing unit," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:
1. A method of graphics processing comprising:
allocating, by a graphics processing unit (GPU), a first ring buffer as a first shared data channel in on-chip graphics memory of the GPU, wherein the first ring buffer is shared by a first two stages of a graphics processing pipeline to store first and second data produced by the respective first two stages of the graphics processing pipeline;

allocating, by the GPU, a second ring buffer as a second shared data channel in the on-chip graphics memory of the GPU that is shared by a second two stages of the graphics processing pipeline to store third and fourth data produced by the respective second two stages of the graphics processing pipeline;

executing, on shader units in the GPU, the first two stages of the graphics processing pipeline and the second two stages of the graphics processing pipeline, including consuming, by one of the first two stages of the graphics processing pipeline, the third data stored in the second ring buffer to produce the first data that is stored into the first ring buffer;

reserving, by the GPU, free space in the first ring buffer for storing the second data produced by a second of the first two stages of the graphics processing pipeline and free space in the second ring buffer for storing the fourth data produced by one of the second two stages of the graphics processing pipeline to prevent deadlock between the first ring buffer and the second ring buffer;

storing, by the GPU into the first ring buffer in on-chip graphics memory, the first and second data produced by first two stages of the graphics processing pipeline executing on the shader units as queues of the first and second data produced by the first two stages of the graphics processing pipeline; and reading, by the GPU from the first ring buffer in on-chip graphics memory, the second data produced by the second of the first two stages of the graphics processing pipeline, including deleting from the ring buffer the second data produced by the second of the first two stages of the graphics processing pipeline that is read from the first ring buffer, thereby increasing space in the first ring buffer for the GPU to store additional data produced by the one of the first two stages of the graphics processing pipeline.

2. The method of claim 1, further comprising:
scheduling, by the GPU, the execution of one or more stages of the graphics processing pipeline on the shader units based at least in part on a status of the first ring buffer or the second ring buffer so that data is available in the first ring buffer or the second ring buffer to be consumed by the one or more stages of the graphics processing pipeline executing on the shader units and free space is available in the first ring buffer or the second ring buffer to store data produced by the one or more stages of the graphics processing pipeline executing on the shader units.

3. The method of claim 1, wherein the second ring buffer operates in cache mode to cache data stored in the second ring buffer, and wherein the first ring buffer operates in first-in-first-out (FIFO) mode.

4. The method of claim 1, wherein the first and second data stored in the first ring buffer comprise vertex data produced by the first two stages of the graphics processing pipeline, and wherein the third and fourth data stored in the second ring buffer comprise primitives produced by the second two stages of the graphics processing pipeline.

5. The method of claim 4, wherein the first two stages of the graphics processing pipeline comprise a vertex shader and a domain shader.

6. The method of claim 4, wherein the second two stages of the graphics processing pipeline comprises a hull shader and a geometry shader.

7. An apparatus configured to process graphics data comprising:
a memory; and
a graphics processing unit (GPU) configured to:
allocate a first ring buffer as a first shared data channel in on-chip graphics memory of the GPU, wherein the first ring buffer is shared by a first two stages of a graphics processing pipeline to store first and second data produced by the respective first two stages of the graphics processing pipeline;

allocate a second ring buffer as a second shared data channel in the on-chip graphics memory of the GPU that is shared by a second two stages of the graphics processing pipeline to store third and fourth data produced by the respective second two stages of the graphics processing pipeline;

execute, on shader units in the GPU, the first two stages of the graphics processing pipeline and the second two stages of the graphics processing pipeline, including consuming, by one of the first two stages of the graphics processing pipeline, the third data stored in the second ring buffer to produce the first data that is stored into the first ring buffer;

reserve free space in the first ring buffer for storing the second data produced by a second of the first two stages of the graphics processing pipeline and free space in the second ring buffer for storing the fourth data produced by one of the second two stages of the graphics processing pipeline to prevent deadlock between the first ring buffer and the second ring buffer;

store, into the first ring buffer in on-chip graphics memory, the first and second data produced by the first two stages of the graphics processing pipeline executing on the shader units as queues of the first and second data produced by the first two stages of the graphics processing pipeline; and read from the first ring buffer in on-chip graphics memory, the second data produced by the second of the first two stages of the graphics processing pipeline, including deleting from the ring buffer the second data produced by the second of the first two stages of the graphics processing pipeline that is read from the first ring buffer, thereby increasing space in the first ring buffer for the GPU to store additional data produced by the one stage of the first two stages of the graphics processing pipeline.

8. The apparatus of claim 7, wherein the GPU is further configured to:
schedule the execution of one or more stages of the graphics processing pipeline on the shader processors based at least in part on a status of the first ring buffer or the ring buffer so that data is available in the first ring buffer or the second ring buffer to be consumed by the one or more stages of the graphics processing pipeline and free space is available in the first ring buffer or the second ring buffer to store data produced by the one or more stages of the graphics processing pipeline executing on the shader processors.

9. The apparatus of claim 7, wherein the second ring buffer operates in cache mode to cache data stored in the second ring buffer, and wherein the first ring buffer operates in first-in-first-out (FIFO) mode.

10. The apparatus of claim 7, wherein the data stored in the first ring buffer comprise vertex data produced by the first two stages of the graphics processing pipeline executing on the shader processors, and wherein the second third and fourth data stored in the second ring buffer comprise primitives produced by the second two stages of the graphics processing pipeline executing on the shader processors.

11. An apparatus comprising:
  means for allocating a first ring buffer as a first shared data channel in on-chip graphics memory of a graphics processing unit (GPU), wherein the first ring buffer is shared by a first two stages of a graphics processing pipeline to store first and second data produced by the respective first two stages of the graphics processing pipeline;
  means for allocating a second ring buffer as a second shared data channel in the on-chip graphics memory of the GPU that is shared by a second two stages of the graphics processing pipeline to store third and fourth data produced by the respective second two stages of the graphics processing pipeline;
  means for executing the first two stages of the graphics processing pipeline and the second two stages of the graphics processing pipeline, including consuming, by one of the first two stages of the graphics processing pipeline, the third data stored in the second ring buffer to produce the first data that is stored into the first ring buffer;
  means for reserving free space in the first ring buffer for storing the second data produced by a second of the first two stages of the graphics processing pipeline and free space in the second ring buffer for storing the fourth data produced by one of the second two stages of the graphics processing pipeline to prevent deadlock between the first ring buffer and the second ring buffer;
  means for storing, into the first ring buffer in on-chip graphics memory, the first and second data produced by the first two stages of the graphics processing pipeline executing on the shader units as queues of the first and second data produced by the first two stages of the graphics processing pipeline; and
  means for reading GPU from the first ring buffer in on-chip graphics memory, the second data produced by the second of the first two stages of the graphics processing pipeline, including deleting from the ring buffer the second data produced by the second of the first two stages of the graphics processing pipeline that is read from the first ring buffer, thereby increasing space in the first ring buffer for the GPU to store additional data produced by the one of the first two stages of the graphics processing pipeline.

12. The apparatus of claim 11, further comprising:
  means scheduling the execution of one or more stages of the graphics processing pipeline on the shader units based at least in part on a status of the first ring buffer or the second ring buffer so that data is available in the first ring buffer or the second ring buffer to be consumed by the one or more stages of the graphics processing pipeline executing on the shader units and free space is available in the first ring buffer or the second ring buffer to store data produced by the one or more stages of the graphics processing pipeline.

13. The apparatus of claim 11, wherein the second ring buffer operates in cache mode to cache data stored in the second ring buffer, and wherein the first ring buffer operates in first-in-first-out (FIFO) mode.

14. The apparatus of claim 11, wherein the first and second data stored in the first ring buffer comprise vertex data produced by the first two stages of the graphics processing pipeline, and wherein the third and fourth data stored in the second ring buffer comprise primitives produced by the second two stages of the graphics processing pipeline.

15. A non-transitory computer-readable storage medium storing instructions that, when executed, cause one or more programmable processors to:
  allocate a first ring buffer as a first shared data channel in on-chip graphics memory, wherein the first ring buffer is shared by a first two stages of a graphics processing pipeline to store first and second data produced by the respective first two stages of the graphics processing pipeline;
  allocate a second ring buffer as a second shared data channel in the on-chip graphics memory that is shared by a second two stages of the graphics processing pipeline to store third and fourth data produced by the respective second two stages of the graphics processing pipeline;
  execute, on shader units, the first two stages of the graphics processing pipeline and the second two stages of the graphics processing pipeline, including consuming, by one of the first two stages of the graphics processing pipeline, the third data stored in the second ring buffer to produce the first data that is stored into the first ring buffer;
  reserve free space in the first ring buffer for storing the second data produced by a second of the first two stages of the graphics processing pipeline and free space in the second ring buffer for storing the fourth data produced by one of the second two stages of the graphics processing pipeline to prevent deadlock between the first ring buffer and the second ring buffer;
  store, into the ring buffer in on-chip graphics memory, the first and second data produced by the first two stages of the graphics processing pipeline executing on the shader units as queues of the first and second data produced by the first two stages of the graphics processing pipeline; and
  read from the first ring buffer in on-chip graphics memory, the second data produced by the second of the first two stages of the graphics processing pipeline, including deleting from the ring buffer the second data produced by the second of the first two stages of the graphics processing pipeline that is read from the first ring buffer, thereby increasing space in the first ring buffer for the one or more programmable processors to store additional data produced by the one of the first two stages of the graphics processing pipeline.

16. The non-transitory computer-readable storage medium of claim 15, wherein the instructions, when executed, further cause the one or more programmable processors to:
  schedule the execution of one or more stages of the graphics processing pipeline on the shader units based at least in part on a status of the first ring buffer or the second ring buffer so that data is available in the first ring buffer or the second ring buffer to be consumed by the one or more stages of the graphics processing pipeline executing on the shader units and free space is available in the first ring buffer or the second ring buffer to store data produced by the one or more stages of the graphics processing pipeline executing on the shader units.

17. The non-transitory computer-readable storage medium of claim 15, wherein the second ring buffer operates in cache mode to cache data stored in the second ring buffer, and wherein the first ring buffer operates in first-in-first-out (FIFO) mode.

18. The non-transitory computer-readable storage medium of claim 15, wherein the first and second data stored in the first ring buffer comprise vertex data produced by the first two stages of the graphics processing pipeline executing on the shader units, and wherein the third and fourth data stored in the second ring buffer comprise primitives produced by the second two stages of the graphics processing pipeline executing on the shader units.

* * * * *